United States Patent [19]

Tucholski

[11] 4,028,478
[45] June 7, 1977

[54] SAFETY SWITCH FOR SEALED GALVANIC CELLS

[75] Inventor: Gary Ronald Tucholski, Parma Heights, Ohio

[73] Assignee: Union Carbide Corporation, New York, N.Y.

[22] Filed: May 24, 1976

[21] Appl. No.: 689,524

[52] U.S. Cl. .................................. 429/61; 429/58; 429/66
[51] Int. Cl.² ........................................ H01M 2/00
[58] Field of Search .................. 429/58, 61, 66

[56] References Cited

UNITED STATES PATENTS

| 2,651,669 | 9/1953 | Newmann | 429/58 |
| 3,081,366 | 3/1963 | Belove | 429/58 |
| 3,373,057 | 3/1968 | Jost et al. | 429/58 |
| 3,622,397 | 11/1971 | Belove | 429/58 |
| 3,676,221 | 7/1972 | Bach | 429/61 |

*Primary Examiner*—Donald L. Walton
*Attorney, Agent, or Firm*—Eugene Lieberstein

[57] ABSTRACT

A Galvanic Cell assembly including a safety switch which comprises an active member and an insulating member. The switch is disposed between the metallic container and the metallic cover plate of the cell. The active member is an electrically conductive spring member having an inclined deformable section with a centrally located opening.

6 Claims, 5 Drawing Figures

Spring Washer Deflection vs Applied Force

SAFETY SWITCH FOR SEALED GALVANIC CELLS

This invention relates to sealed galvanic cells or batteries and more particularly to a sealed galvanic cell construction in which the electrical continuity of the cell is broken in response to a predetermined physical deformation of the cell.

Tightly sealed alkaline cells can pose a safety hazard under misuse or abuse conditions simply through overcharge or overdischarge where internal gas pressure rises uncontrollably. Unless suitably protected the internal pressure can rise to hundreds of pounds per square inch and may result in seal rupture. Normal safeguards include pressure vents which may operate in combination with a gas permeable seal diaphragm designed to relieve some of the excess gas through diffusion. Further precautionary measures include provision for destruction of the seal diaphragm by penetration or rupture. Although such steps are necessary from a safety standpoint, once the seal is broken the cell is subject to loss of corrosive electrolyte which itself is potentially harmful, unsightly and damaging to its immediate surrounding environment.

An alternative or augmentative approach is to provide a separate control element which senses battery temperature and/or pressure and cuts off current flow through the cell. The prior art is replete with auxiliary controls of such type for temporarily interrupting current flow at one of the cell terminals in response to a build up of gas pressure for example. These controls take up space, are expensive and suffer from a lack of positive action and a susceptibility to instability and chattering of the electrical contact. Moreover, repeated on-off cycling will eventually bring the cell to a ruinous state accompanied by a rupturing of the diaphragm and loss of electrolyte to outside the cell.

Accordingly, it is the principle object of the present invention to provide an improved galvanic cell construction which includes in combination a sealed cell and compact switch means which will irreversibly cut-off current flow through the cell in response to a predetermined expansion of the cell container.

The foregoing and other objects of the present invention will become appparent from the following detailed description of the invention when read in connection with the accompanying drawings of which:

Figure 1:
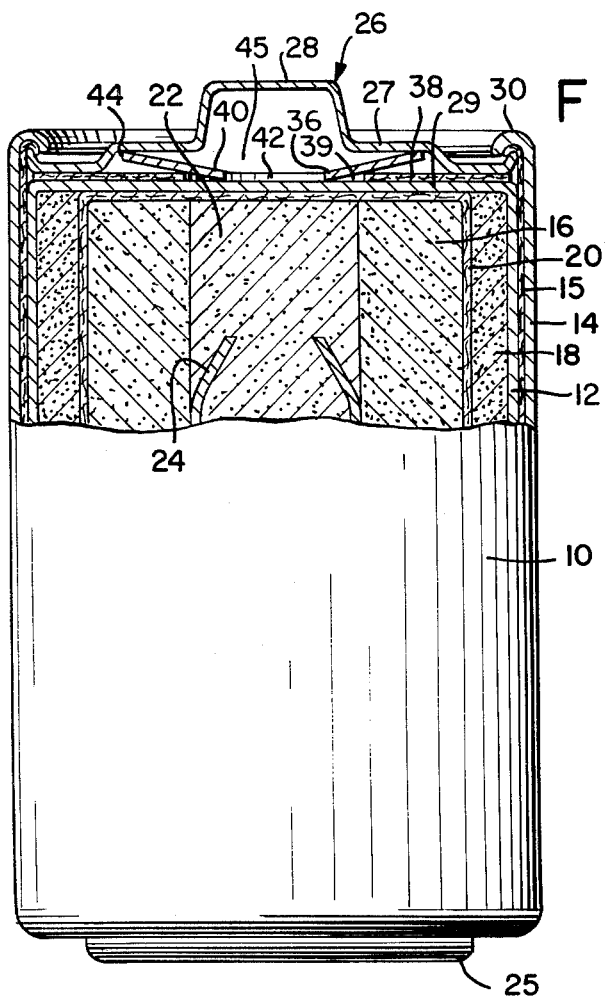
FIG. 1 is an elevational view partially in section of an alkaline manganese dioxide zinc cell embodying the switch means of the present invention.
Figure 3:
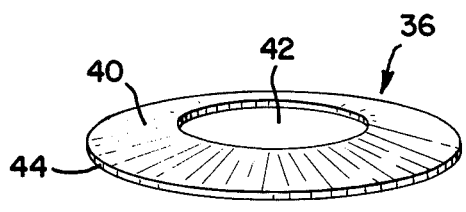
FIG. 3 is a diagrammatic view of the active member of the preferred switch means of the present invention.
Figure 2:
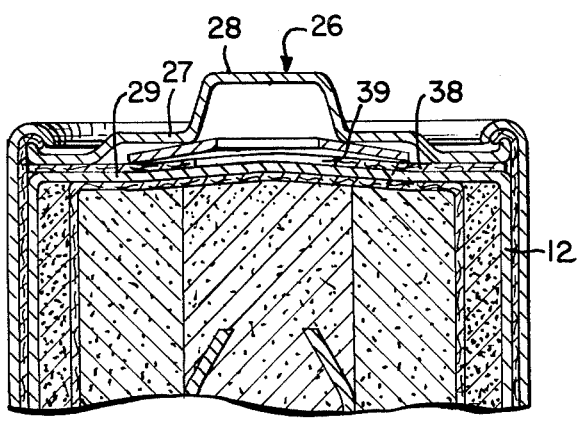
FIG. 2 is a fragmentary view of a section of the cell of FIG. 1 showing the switch means in its open configuration after the cell has been abuse charged.

Referring now to the drawings and particularly to FIGS. 1-3 inclusive in which a typical alkaline galvanic cell 10 of the present invention is shown comprising an inverted metallic cupped container 12 provided with an outer metal jacket 14 separated by an insulating liner 15 of preferably paper or other fibrous material. Disposed within the container 12 is a tubular anode 16, a tubular cathode 18, a separator 20 and an alkaline electrolyte 22. An anode current collector 24 extends lengthwise within the cell 10, parallel to the longitudinal axis of the cell, from a location in contact with both the anode 16 and the electrolyte 22 to the negative terminal 25 where it terminates. A conventional alkaline manganese dioxide zinc cell construction conforming to the foregoing general description is shown in greater detail in U.S. Pat. No. 3,314,824, issued on Apr. 18, 1967 to F. Spanur. This patent also provides a detailed description of a suitable puncture type safety seal for corresponding use in the present cell 10 at the negative terminal 25 end of the cell, if so desired.

A metallic cover plate 26 having a shoulder portion 27 and a raised protuberance 28 is mounted over the bottom end 29 of the container 12 with the raised protuberance 28 centered in substantial alignment with the longitudinal axis of the cell 10. The raised protuberance represents the positive terminal of cell 10. The shoulder portion 27 and the raised protuberance 28 leave a void or cavity 45 between the cover plate 26 and the bottom end 29 of the container 12 in which the switch means of the present invention is located. The switch means of the present invention comprises an active member 36 and a passive member 38. The outer metal jacket 14 is crimped over the cover plate 26 at the positive end of the cell 10 to form a circumferential edge 30 which compresses the cover plate 26 and the active and passive members 36 and 38 against the metal container 12.

The active member 36 of the switch means of the present invention is an electrically conductive spring member having an inclined deformable section 40 with a centrally located opening 42 of any desired shape although a circular geometry is preferred. The passive member 38 is an insulator of preferably a plastic material, although a fibrous insulator would be acceptable, having a central aperture 39 which is larger in size than the opening 42 of spring member 36. The spring member 36 is seated in cell 10 with its edge 44 in slidable contact against the cover plate 26 and with its opening 42 in substantial alignment with the raised protuberance 28 of the cover plate 26. The insulating member 38 lies between the spring member 36 and the metal container 12 with its central aperture 39 arranged concentric to the opening 42 of spring member 36. Since the aperture 39 of the insulator 38 is larger than the opening 42 of the spring member 36 a predetermined surface area of the inclined section 40 will abut the metallic cupped container 12 to insure electrical continuity between the metal container 12 and the cover plate 26 during the normal operation of the cell 10.

The spring member 36 should possess a deflection characteristic which will result in the inclined deformable section 40 being irreversibly displaced from a first stable position to a second stable position upon the application of a predetermined force resulting from a bulge in the container 12 as will be explained in greater detail hereafter. The second stable position should preferably represent a substantial geometrical inversion of the first position. It is essential that the deflection be related to the applied force in a manner such that only after reaching the predetermined applied force will the deformable section 40 irreversibly move from the first stable position to the second stable position and preferably with almost no additional applied force. The inversion of section 40, substantially inside cut as shown in FIG. 2, will occur for a given spring member geometry having prescribed dimensional limits as will be more specifically defined hereafter.

Although the spring member 36 can be of any configuration having an inclined deformable section 40, which need not be linear, a frustum geometry as is diagrammatically illustrated in FIG. 3 is preferred. A spring washer of the conventional Belleville category is typical of such frustum geometry. To exhibit the desired deflection characteristic the thickness of the spring member 36 should be generally of no more than about 0.010 inches.

Figure 4B:
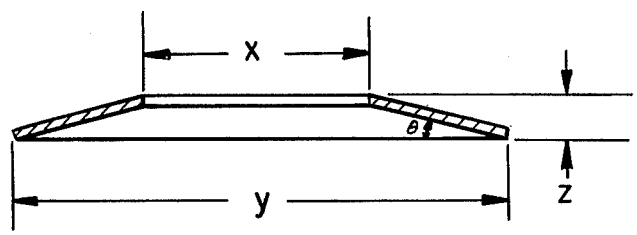
FIG. 4b is a cross-section of the preferred active member of the switch means of FIG. 3.
Figure 4A:
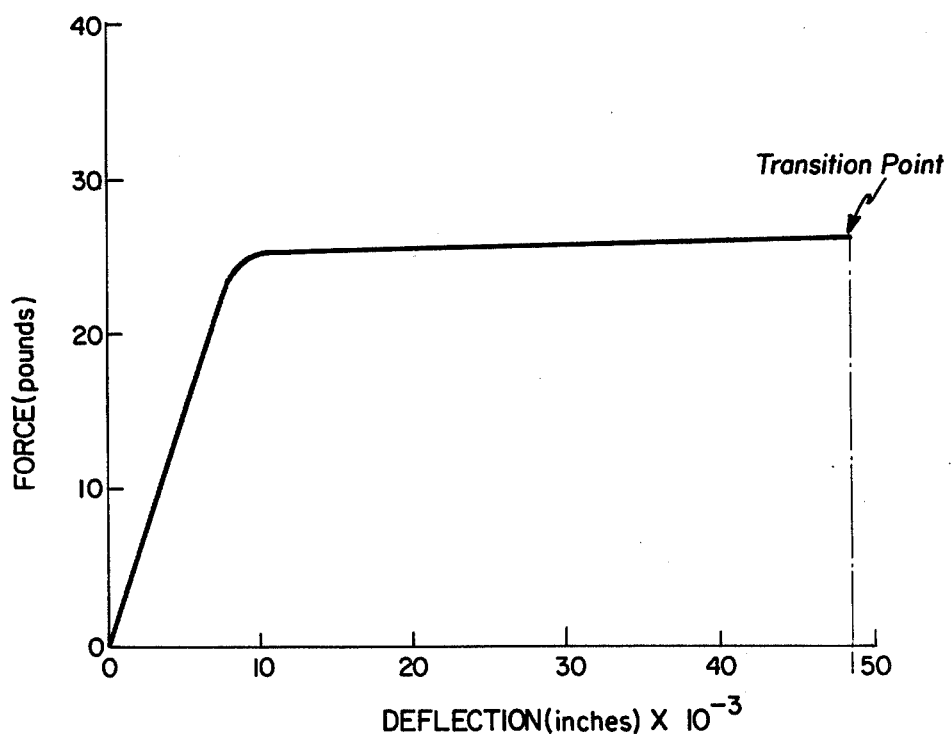
FIG. 4a is a graph illustrating the force-deflection characteristics for the active member of the switch means of the present invention.

FIG. 4a illustrates a deflection characteristic curve in accordance with the present invention for the spring member 36 as used in a standard D size alkaline $M_nO_2$ battery cell for cell 10. The point of transition from a stable first position to an inverted stable second position occurs at about a twenty-five pound applied force for a spring member 36 of cold rolled steel having a thickness of about 0.008 inches with an included angle $\theta$ of preferably about 15°. The included angle should not exceed above about 20 degrees. The dimensions $x$, $y$ and $z$ of the spring member 36 as shown in FIG. 4b may vary widely in relation to one another and with the size of the battery cell to be controlled.

The metal cupped container 12 responds to a build up in internal pressure by bulging outwardly. Such physical deformation is typical of all sealed alkaline cells although the point of yield and the container bulge displacement will differ with variations in container size, composition and thickness. The applied force upon spring member 36 resulting from the bulge in the container 12 will elastically deflect the inclined section 40 until a bulge corresponding to an applied force equal to the transition level is reached at which point the inclined section 40 will flip to a substantially inverted position and irreversibly break the electrical connection between the outer cover 26 and the metal container 12.

Any sealed galvanic battery cell can be electrically interrupted at a predetermined cutoff point corresponding to the transition level of the spring member 36. By appropriate correlation between the spring transition level and container bulge the battery can be electrically disconnected at any predetermined build up of pressure within reasonable limits.

What is claimed is:

1. A sealed galvanic cell assembly comprising in combination:
   a cylindrical metal container including a positive and negative electrode and an electrolyte, with said container being in electrical contact with said positive electrode;
   an outer cover mounted over said metal container and being of a predetermined configuration to form a substantially centrally located cavity between said cover and said container;
   switch means disposed in said cavity for providing an electrical connection between said container and said outer cover during normal operation of the cell and being responsive to a predetermined expansion of said container for irreversibly breaking such electrical contact;
   said switch means being held in a slidable relationship with said container and cover and comprising an electrically conductive spring member having an inclined deformable section and a substantially centrally disposed opening.

2. A sealed galvanic cell assembly as defined in claim 1 wherein said inclined deformable section is caused to switch from a first stable position to a substantially inverted second stable position in response to said predetermined expansion of said container.

3. A sealed galvanic cell assembly as defined in claim 2 wherein said switch means further comprises a passive member of insulating material disposed between said spring member and said container and having a central aperture of size substantially larger than the central opening of said spring member.

4. A sealed galvanic cell assembly as defined in claim 3 wherein said central aperture of said insulating member and the opening of said spring member are both circular and concentric to one another.

5. A sealed galvanic cell assembly as defined in claim 4 wherein said inclined deformable section has an included angle of no greater than about 20° with respect to the horizontal.

6. A sealed galvanic cell assembly as defined in claim 5 wherein said outer cover includes a raised centrally located protuberance representing an electrical terminal and wherein said opening of said spring member is arranged congruently with said protuberance.

* * * * *